June 5, 1923.
H. LUDWIG
FREE WHEEL HUB
Filed Aug. 1, 1921
1,457,311
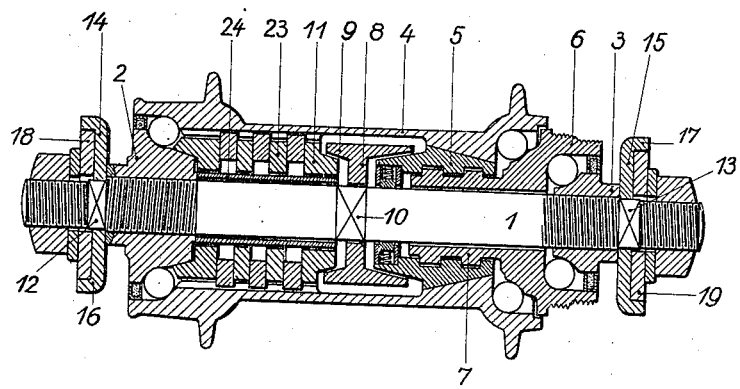
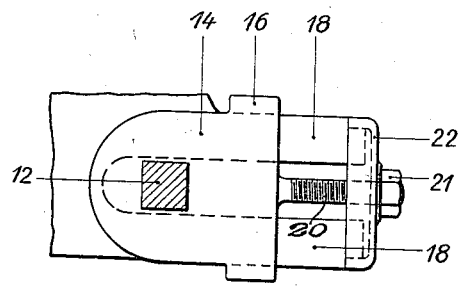
Inventor:
Hans Ludwig
by
Rosenbaum Stockinge & Borst
Attys

Patented June 5, 1923.

1,457,311

UNITED STATES PATENT OFFICE.

HANS LUDWIG, OF OBERURSEL AM TAUNUS, GERMANY.

FREE WHEEL HUB.

Application filed August 1, 1921. Serial No. 489,028.

*To all whom it may concern:*

Be it known that I, HANS LUDWIG, engineer, citizen of Germany, residing at Oberursel am Taunus, in Germany, have invented certain new and useful Improvements in or Relating to Free Wheel Hubs, (for which I have filed applications in Germany, March 19, 1919, and June 3, 1919; Austria, January 3, 1920; Poland, May 17, 1920; Czechoslovakia, April 2, 1920; Sweden, June 28, 1920; Norway, June 29, 1920; France, July 9, 1920; Italy, June 30, 1920; England, June 30, 1920; Netherlands, January 29, 1921, and August 5th, 1920; Switzerland, June 28th, 1920; Belgium, July 5th, 1920; Hungary, August 25th, 1920; Denmark, October 1st, 1919, and December 31st, 1920), of which the following is a full, clear, and exact description.

In free wheel hub constructions provided with back pedalling brake as hitherto used, the braking momentum is transmitted to the frame solely on one side of the axle by means of a relatively long lever, which must be separately secured to the frame by means of a clip device. By this provision the frame is stressed one sidedly with considerable force so that during a sudden application of the brake it frequently happens that the whole frame is bent at its point. This arrangement has, moreover, the drawback that the transmission lever must always be detached from the frame when it is desired to tighten the chain.

All these drawbacks are avoided by the novel free wheel hub, according to this invention. By this improvement the braking momentum is transmitted equally to both ends of the axle and from the latter to the frame. As a result a uniform distribution of the momentum takes place at two points of the frame so that each point is subjected only to one half of the momentum. Consequently the lever arm employed for transmission may be quite short. By preference it is constructed in the shape of a disc which, by means of a square hole, is mounted on a correspondingly squared end at each end of the axle and by means of a bent portion grips over the frame fork. This disc may be constructed at the same time as a chain tightener inasmuch as the bolt for tightening the chain is arranged thereon. Consequently the whole wheel may be slid on to the fork of the frame and the chain can be tightened without it being necessary to provide for a special connection between the hub and the brake lever.

In addition, in the improved free wheel hub, according to this invention, the sleeve fitted thereon and carrying a part of the brake rings is not rigidly connected with the axle but is loosely rotatable thereon. This renders it possible that when the brake is released, the sleeve, together with the brake rings is free to rotate with the remaining rings and accordingly with the wheel hub if the rings have become sufficiently detached from each other. Therefore, in no case will the rings rub one on the other, only when the brake is applied the clutch sleeve enters the clutch disc secured to the sleeve thus holding the latter stationary in which action the brake rings are simultaneously pressed against one another. The other end of the sleeve is likewise provided with a clutch disc which is fitted on an appropriately shaped clutch cone cooperating with the stationary ball race cone of the axle. Since the sleeve is coupled with stationary parts on both sides, the ball race cone is subjected only to half the braking momentum, thus rendering a special adjusting lever for this cone superfluous.

The accompanying drawing illustrates by way of example a constructional form of a hub according to this invention, in which:

Figure 1 is a longitudinal section.

Figure 2 is a lateral view of the chain tightener.

Mounted on the axle 1 in a known manner are the two cones 2 and 3 for the ball bearings of the hub 4. Arranged within this hub likewise in a known manner is the clutch cone 5 for the free wheel which is actuated by the worm 7 forming part of the gland 6 which carries the sprocket wheel.

Mounted centrally on the axle 1 is a disc 8 provided with a double cone 9. This disc is movable but nonrotatably secured on the axle 1 by means of a square portion 10 or in any other convenient manner. On one side the double cone 9 is in engagement with the clutch cone 5, while on the opposite side it bears on the last brake disc 11.

The two ends of the axle 1 are provided with the square members 12 and 13 respectively mounted on which are the discs 14 and 15. These discs are bent over at 16 and 17 and by means of these offsets grip over or under the two forks 18 or 19 of the frame. Mounted on each disc 14, 15, is the chain tightening bolt 20 carrying at its end the tightening nut 21 which, by means of a disc 22, is supported on the fork ends in a known manner.

Upon braking by back pedalling, the clutch cone 5 is displaced to the left, so that its conical member enters the corresponding cone cavity in the disc 8, thus forcing the latter to the left and into contact with the last brake disc 11 on its opposite side. In this way braking takes place and the braking momentum is now transmitted to the axle by the square member 10 and from its ends through the square portions 12 and 13 and by the discs 14 and 15 by way of their offsets 16, 17, on to the frame. By this distribution of the braking momentum on two points of the frame, the strain is considerably reduced, enabling the transmission disc to be made relatively small and to dispense with the brake lever. The wheel may be mounted on the frame fork and the chain tightened without requiring any particular attachment for the transmission of the brake momentum.

The disc brake moreover is so constructed that the washers 23 are not directly mounted on the axle 1 but on a sleeve 24 which is loosely rotatable on the axle. On releasing the brake the sleeve 24 may be carried along by the washers if the latter have not become sufficiently separated. In this way the washers are not subjected to friction on the axle either during free or during normal running but are capable of rotating with its sleeve about the axle. The sleeve, however, is entirely free, and according to whether the friction between it and the axle or between it and the washers is greater or smaller, it will remain stationary or rotate therewith. In this manner a condition is created corresponding with minimum friction a minimum consumption of power or fuel and resulting in a minimum wear.

Under certain conditions the sleeve 24 may be allowed to run on separate ball bearings of the axle in order to reduce the friction wheel further.

The double cone 9 may, on its faces, be provided with teeth adapted to engage with corresponding teeth on the parts 5 and 11.

Now what I claim and desire to secure by Letters Patent is the following:

1. In free wheel hubs the combination of a back pedalling brake with means within the hub for transmitting the braking momentum from the hub to the axle of the hub, and means for securing both ends of this axle fixedly to the frame substantially as and for the purpose described."

2. In free wheel hubs the combination of a back pedalling brake with a double cone on the axle adapted to be engaged by the clutch member and by the brake washers for transmitting the braking momentum from both ends of the axle to the frame, substantially as and for the purpose described.

3. In free wheel hubs the combination of a back pedalling brake with a double cone on the axle adapted to be engaged by the clutch member and by the brake washers for transmitting the braking momentum from both ends of the axle to the frame by discs gripping with offsets over the frame, substantially as and for the purpose described.

4. In free wheel hubs the combination of a back pedalling brake with a double cone on the axle adapted to be engaged by the clutch member and by the brake washers for transmitting the braking momentum from both ends of the axle to the frame by discs gripping with offsets over the frame and carrying the bolts for the chain tightener, substantially as and for the purpose described.

5. In free wheel hubs the combination of a back pedalling brake, of which half the brake washers are arranged on a separate and freely rotatable sleeve, with means for transmitting the braking momentum from both ends of the axle to the frame, substantially as and for the purpose described.

6. In free wheel hubs the combination of a back pedalling brake, of which half the brake washers are arranged on a separate and freely rotatable sleeve, with a double cone on the axle adapted to be engaged by the clutch member and by the brake washers for transmitting the braking momentum from both ends of the axle to the frame, substantially as and for the purpose described.

7. In free wheel hubs the combination of a back pedalling brake, of which half the brake washers are arranged on a separate and freely rotatable sleeve with a double cone on the axle adapted to be engaged by the clutch member and by the brake washers for transmitting the braking momentum from both ends of the axle to the frame by discs gripping with offsets over the frame, substantially as and for the purpose described.

8. In free wheel hubs the combination of a back pedalling brake, of which half the brake washers are arranged on a separate and freely rotatable sleeve with a double cone on the axle adapted to be engaged by the clutch member and by the brake washers for transmitting the braking momentum from both ends of the axle to the frame by discs gripping with offsets over the frame and carrying the bolts for the chain tightener, substantially as and for the purpose described.

9. In free wheel hubs to be mounted between frame members, the combination of an axle, a wheel hub and a driving element mounted on said axle for rotation independently of one another, braking mechanism within the wheel hub acting through the intermediate part of the axle to the end portions of the axle and thence to the frame, and a clutch operative by the driving element for effecting a connection between the element and either the braking mechanism or the hub dependent upon the direction of rotation of the driving element to operate the braking mechanism or drive the wheel hub.

10. In free wheel hubs to be mounted between frame members, an axle, discs non-rotatably carried by the end portions of the axle and having portions interlocking with the frame members, a wheel hub mounted for rotation on said axle, means for creating a braking action between the wheel hub and an intermediate part of the axle, and means operative to drive the hub, permit free rotation of the hub on the axle, and to render the braking means effective through the axle to the frame, as desired.

11. In free wheel hubs to be mounted between frame members, an axle, discs non-rotatably carried by the end portions of said axle and slidably interlocking with said frame members, co-operating means between said discs and frame members for shifting said axle along the frame members, while being held against rotation relatively thereto, a wheel hub rotatably mounted on said axle, and brake means for said hub acting through an intermediate portion of the axle to the frame for controlling rotation of the hub on said axle.

12. In free wheel hubs to be mounted between frame members, an axle, discs non-rotatably carried by the end portions of said axle and slidably interlocking with said frame members, co-operating means between said discs and frame member for shifting said axle along the frame members, while being held against rotation relatively thereto, a wheel hub and a driving element mounted on said axle for rotation independently of one another, braking mechanism within the wheel hub and acting through the intermediate part of the axle to the end portions of the axle and thence to the frame, a clutch operative by the driving element for selectively effecting a connection between said element and either the wheel hub to drive the latter or to the braking mechanism to render the latter effective, said clutch in an intermediate position allowing free rotation of the wheel hub on said axle.

13. In free wheel hubs to be mounted between frame members, an axle, means for non-rotatably connecting the end portions of said axle to the frame members, a wheel hub and a driving element rotatably mounted on said axle, a disc slidably and non-rotatably mounted upon an intermediate portion of the axle within the hub, a worm clutch between said element and hub for driving the hub from said element, a braking device within the hub controlled by the said disc, said worm clutch being also operative to shift said disc along the axle and render the braking device effective when the clutch is disconnected from the hub.

14. In free wheel hubs to be mounted between slotted frame members, an axle, discs non-rotatably carried by the end portions of the axle and having flanges slidably embracing the frame members, a screw extending from each of said discs towards the end of the frame members, a disc adjustably carried by the end of each screw and abutting over the end of the frame members, a nut on the end of each screw to pull the discs towards the ends of the frame members, a wheel hub rotatably carried by the axle, and braking mechanism within the hub and acting through the axle to the frame to control rotation of the hub.

15. In free wheel hubs to be mounted between frame members, an axle, means for securing said axle non-rotatably to said frame members, a wheel hub rotatably mounted on said axle, and means for creating a braking action between the wheel hub and an intermediate part of the axle to control rotation of the wheel.

16. In free wheel hubs to be mounted between frame members, an axle, means for securing said axle non-rotatably to said frame members, a wheel hub rotatably mounted on said axle, means for creating a braking action between the wheel hub and an intermediate part of the axle to control rotation of the wheel, and means operable into three positions, in one of which it drives the wheel hub, in another of which the wheel hub is free to rotate and in the other of which it operates the means for creating the braking action to retard rotation of the wheel.

17. In free wheel hubs to be mounted between frame members, an axle, means for securing said axle non-rotatably to said frame members, a wheel hub and a driving element mounted for rotation on said axle independently of one another, a worm clutch for selectively connecting said element to said hub to drive the same or disconnect it therefrom, a disc slidably and non-rotatably carried by an intermediate portion of the axle, and brake washers between said disc and the hub, said clutch being adapted to engage said disc when operated in a disconnecting direction and cause a braking action of said washers between the hub and said disc.

18. In free wheel hubs to be mounted between frame members, an axle, means for securing said axle non-rotatably to said frame members, a wheel hub and a driving element mounted for rotation on said axle independently of one another, a worm clutch for selectively connecting said element to said hub to drive the same or disconnect it therefrom, a disc slidably and non-rotatably carried by an intermediate portion of the axle, brake washers between said disc and the hub, said clutch being adapted to engage said disc when operated in a disconnecting direction and cause a braking action of said washers between the hub and said disc, and a sleeve rotatable on said axle and on which said washers are rotatable.

In witness whereof, I hereunto subscribe my signature.

HANS LUDWIG.